United States Patent

Paul et al.

(10) Patent No.: US 9,692,318 B2
(45) Date of Patent: Jun. 27, 2017

(54) SYNCHRONOUS RECTIFIER, USE OF SUCH A SYNCHRONOUS RECTIFIER IN A SWITCHING POWER SUPPLY, AS WELL AS A SWITCHING POWER SUPPLY

(71) Applicant: Endress + Hauser GmbH + Co. KG, Maulburg (DE)

(72) Inventors: Tobias Paul, Schopfheim (DE); Niels Donkers, Schopfheim (DE); Juan Angel Alonso-Schonlau, Lorrach (DE); Klaus Ruf, Rheinfelden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 14/890,669

(22) PCT Filed: Apr. 22, 2014

(86) PCT No.: PCT/EP2014/058063
§ 371 (c)(1),
(2) Date: Nov. 12, 2015

(87) PCT Pub. No.: WO2014/183955
PCT Pub. Date: Nov. 20, 2014

(65) Prior Publication Data
US 2016/0094146 A1    Mar. 31, 2016

(30) Foreign Application Priority Data

May 14, 2013 (DE) .................. 10 2013 104 944

(51) Int. Cl.
*H02M 7/217* (2006.01)
*H02M 3/335* (2006.01)
(Continued)

(52) U.S. Cl.
CPC ............. *H02M 7/217* (2013.01); *H02M 1/10* (2013.01); *H02M 3/335* (2013.01); *H02M 7/219* (2013.01);
(Continued)

(58) Field of Classification Search
CPC ................... H02M 1/32; H02M 7/219; H02M 2007/2195; H02M 2001/007
See application file for complete search history.

(56) References Cited

U.S. PATENT DOCUMENTS 5,510,972 A * 4/1996 Wong ..................... H02M 7/219
363/125
5,701,243 A * 12/1997 Youn .................... H02M 1/4241
363/134
(Continued)

FOREIGN PATENT DOCUMENTS

DE      3304759 A1   8/1984
DE      69524465 T2  5/2002
(Continued)

OTHER PUBLICATIONS

German Search Report, German Patent Office, Munich, Germany, Jan. 17, 2014.
(Continued)

*Primary Examiner* — Matthew Nguyen
*Assistant Examiner* — Yusef Ahmed
(74) *Attorney, Agent, or Firm* — Bacon & Thomas, PLLC

(57) ABSTRACT

A synchronous rectifier, which rectifies an alternating voltage signal as an input signal and/or forwards a dc voltage signal as an input signal for use as an output signal. Included is a rectifying unit composed of at least one controllable switch element; a smoothing unit, which is connected to the rectifying unit and smooths the signal rectified or forwarded by the rectifying unit, in order to provide a smoothed signal
(Continued)

for use as output signal; a control logic, which controls the rectifying unit based on the input signal and the output signal coming from the smoothing unit.

8 Claims, 3 Drawing Sheets

(51) Int. Cl.
    *H02M 7/219*     (2006.01)
    *H02M 1/10*     (2006.01)
    *H02M 1/32*     (2007.01)
    *H02M 1/00*     (2006.01)

(52) U.S. Cl.
    CPC ............ *H02M 7/2176* (2013.01); *H02M 1/32* (2013.01); *H02M 2001/007* (2013.01); *H02M 2007/2195* (2013.01); *Y02B 70/1408* (2013.01)

(56) References Cited

U.S. PATENT DOCUMENTS

| | | | |
|---|---|---|---|
| 5,786,992 A | 7/1998 | Vinciarelli | |
| 6,262,899 B1 | 7/2001 | Raddi | |
| 6,324,084 B1* | 11/2001 | Fujisawa | G04G 19/02 363/127 |
| 6,366,485 B1* | 4/2002 | Fujisawa | G04C 10/00 363/127 |
| 6,433,491 B2* | 8/2002 | Halberstadt | 315/224 |
| 6,519,164 B1* | 2/2003 | Weng | H02M 1/34 363/17 |
| 8,942,018 B2* | 1/2015 | Ho | H02M 7/217 363/126 |
| 2005/0168074 A1* | 8/2005 | To | H02M 5/2573 307/108 |
| 2007/0170900 A1* | 7/2007 | Lee | H02M 7/062 323/260 |
| 2008/0239764 A1* | 10/2008 | Jacques | H02M 1/32 363/21.04 |
| 2008/0285316 A1 | 11/2008 | Park | |
| 2009/0129133 A1* | 5/2009 | Khan | H02M 7/2176 363/126 |
| 2009/0225575 A1 | 9/2009 | Vinciarelli | |
| 2010/0046264 A1* | 2/2010 | Ho | H02M 7/219 363/127 |
| 2011/0032731 A1* | 2/2011 | Coleman | H02M 1/4258 363/21.12 |
| 2011/0199799 A1* | 8/2011 | Hui | H02M 7/219 363/127 |
| 2011/0216563 A1 | 9/2011 | Ribarich | |
| 2011/0266969 A1* | 11/2011 | Ludorf | H02M 1/4258 315/294 |
| 2012/0099356 A1* | 4/2012 | Usami | H02M 7/219 363/126 |
| 2012/0286708 A1* | 11/2012 | Ikeda | H02M 7/062 318/400.3 |
| 2013/0242622 A1* | 9/2013 | Peng | H02M 3/33507 363/21.12 |
| 2013/0314072 A1* | 11/2013 | Miyazaki | G01R 25/00 324/76.77 |
| 2014/0085941 A1* | 3/2014 | Li | H02M 3/33523 363/21.12 |
| 2014/0218978 A1* | 8/2014 | Heuken | H05B 33/0818 363/21.16 |
| 2014/0253032 A1* | 9/2014 | Bruwer | H02M 1/36 320/108 |
| 2014/0268956 A1* | 9/2014 | Teren | H02M 7/219 363/89 |
| 2014/0334195 A1* | 11/2014 | Nussbaum | H02M 3/3376 363/21.04 |
| 2015/0280573 A1* | 10/2015 | Gong | H02M 3/33523 363/21.14 |

FOREIGN PATENT DOCUMENTS

| | | |
|---|---|---|
| DE | 102011053622 A1 | 3/2013 |
| EP | 1056190 A1 | 11/2000 |
| EP | 1993197 A2 | 11/2008 |
| EP | 2523296 A1 | 11/2012 |
| WO | 9601003 A1 | 1/1996 |
| WO | 9811658 A1 | 3/1998 |

OTHER PUBLICATIONS

International Search Report, EPO, The Netherlands, Aug. 28, 2014.
English Translation of the International Preliminary Report on Patentability, WIPO, Geneva, CH, Nov. 26, 2015.

\* cited by examiner

SYNCHRONOUS RECTIFIER, USE OF SUCH A SYNCHRONOUS RECTIFIER IN A SWITCHING POWER SUPPLY, AS WELL AS A SWITCHING POWER SUPPLY

TECHNICAL FIELD

The invention relates to a synchronous rectifier, the use of such a synchronous rectifier in a switching power supply, as well as a switching power supply with such a synchronous rectifier.

BACKGROUND DISCUSSION

All electronic devices, especially also field devices of automation technology, require a power supply.

Field devices of automation technology are applied for registering and/or influencing process variables. Examples of such field devices include fill level measuring devices, mass flow measuring devices, pressure- and temperature measuring devices, pH-redox-potential-measuring devices, conductivity measuring devices, etc., which, as sensors, register the corresponding process variables, fill level, flow, pressure, temperature, pH-value and conductivity value, respectively. Serving for influencing process variables are so-called actuators, e.g. valves, which control the flow of a liquid in a pipeline section or pumps, which change the fill level in a container. Referred to as field devices are, thus, in principle, all devices, which are applied near to the process and deliver, or process, process relevant information. In connection with the invention, the terminology, field device, thus, includes all types of measuring devices and actuators, as well as e.g. gateways, radio adapters and other bus participants integrated/integrable in a bus system.

A large number of such field devices are manufactured and sold by the group of firms, Endress+Hauser.

As already mentioned, such field devices require a power supply. Known from the state of the art are essentially three variants for supplying devices, respectively field devices, with electrical power from the grid. In the case of all three variants, in the case of grid operation, a galvanic isolation by means of at least one transformer is necessary. The simplest case of a rectification is that, in which a grid transformer (50 Hz) is applied with a following linear voltage regulator. The efficiency of such a circuit is, however, relatively poor. In order to reduce these losses, the linear voltage regulator is replaced by a switching regulator. In this way, an efficiency from 50-70% can be achieved. Because the switching regulator is located on the secondary side of the grid transformer, such circuits are also referred to as secondary switched power supplies. The efficiency of these secondary switched power supplies can be further increased through use of a high-frequency transformer (typically some kHz up to a MHz). However, the technical effort in the case of this circuit form is the greatest. First, the grid voltage must be rectified, then converted into a high-frequency alternating voltage, in order to be able to then transform it. For a desired output voltage, it is additionally still necessary to control the pulse width. Used for this is a control loop, which is embodied between the secondary side and the primary side. In order further to have a galvanic isolation, a potential isolation, for example, an optocoupler, is built into the control loop. Such circuit forms are also referred to as primary switched power supplies. These primary switched power supplies have typically an input voltage range, which extends over a factor of about 5, for example, from 20 to 100V, wherein in the low input voltage region, typically about 20 to 40V, the efficiency is, however, as low, as 60%.

SUMMARY OF THE INVENTION

An object of the invention is to optimize such switching power supplies.

The object is achieved by a synchronous rectifier, the use of such a synchronous rectifier in a switching power supply as well as by a switching power supply for energy supply of a device.

As regards the synchronous rectifier, the object is achieved by a synchronous rectifier, which rectifies an alternating voltage signal as input signal and/or forwards a dc voltage signal as input signal for use as output signal, at least comprising:

a rectifying unit composed of at least one controllable switch element;

a smoothing unit, which is connected to the rectifying unit and smooths the signal rectified or forwarded by the rectifying unit, in order to provide a smoothed signal for use as output signal;

a control logic, which controls the rectifying unit based on the input signal and the output signal coming from the smoothing unit.

According to the invention, the switching power supply is optimized by use of a synchronous rectifier, which achieves a high efficiency in the case of low input voltages. Additionally, the great technical effort, which is required in the case of such primary switched power supplies, is reduced by use of the synchronous rectifier, since this in the case of use in a switching power supply, especially a low voltage power supply, no longer absolutely requires a control loop between the primary side and the secondary side. Instead, the synchronous rectifier includes a control logic, which controls at least one controllable switch element of a rectifying unit. The control logic produces the required control signals, for example, by means of a microcontroller-run program based on the in- and output signals. In this way, the synchronous rectifier adapts flexibly to the input signal, wherein the control logic detects the input voltage independently of whether it is a direct voltage or an alternating voltage with any frequency, and assures that a corresponding output signal is available, respectively is present, on the synchronous rectifier. Evaluated, in such case, in the input signal are especially the frequency and the amplitude.

The synchronous rectifier enables, thus, in the case, in which an alternating voltage is present as input voltage, the rectification of such, and in the case, in which a direct voltage is present, the forwarding of such, so that either the rectified alternating voltage signal is provided as output signal or else the forwarded dc voltage signal is provided as output signal. Furthermore, the opportunity is provided, by using the control logic, to perform plausibility examinations and/or defect analyses.

In an advantageous embodiment of the invention, an overvoltage protection unit is provided, which is arranged between the rectifying unit and the smoothing unit and limits the signal rectified by the rectifying unit or the forwarded signal to a certain turn off threshold. The embodiment provides especially, that the turn off threshold is changeable. A synchronous rectifier constructed in such a manner offers the advantage that the smoothing unit, which preferably includes a capacitor, is adaptable optimally in its properties, especially its capacitance and, thus, also in its physical size. The overvoltage protection unit in the case, in which the rectified or forwarded signal exceeds the turn off threshold, limits the signal, in order to avoid damage to the smoothing unit.

In this way, either the signal rectified by the rectifying unit or the forwarded signal can be limited, before it is fed to the smoothing unit. This reduces the space requirement of the smoothing unit.

In an additional advantageous embodiment of the invention, the control logic includes a digital logic unit, which by means of at least one control signal operates the at least one controllable switch element of the rectifying unit. Furthermore, it is provided that the control logic includes a zero point detection is unit and a comparison unit, wherein the zero point detection unit registers the zero crossings of the input signal and derives therefrom a first auxiliary signal and the comparison unit compares the input signal with the output signal and derives therefrom a second auxiliary signal. Especially, it is also provided that the digital logic unit based on the first and the second auxiliary signals produces the at least one control signal for operating the at least one controllable switch element of the rectifying unit. Furthermore, the embodiment provides that the first auxiliary signal and the second auxiliary signal and the control signal are digital signals.

In an additional advantageous embodiment of the invention, the at least one controllable switch element is a semiconductor. Examples of semiconductor-switch elements include, in such case, especially field effect transistors.

As regards the use of a synchronous rectifier, the object is achieved by features including that a synchronous rectifier such as described at least in one of the above described embodiments is used in a switching power supply, wherein the synchronous rectifier is arranged on the primary side and receives an input signal of the switching power supply and supplies an output signal to a subsequent direct voltage converter, wherein the direct voltage converter forms a galvanic isolation between primary side and secondary side and the switching power supply requires no control loop between the primary side and the secondary side.

As regards the switching power supply, the object is achieved by a switching power supply for energy supply of a load, wherein the switching power supply has a primary side and a secondary side, wherein the primary side has at least one synchronous rectifier formed as claimed in at least one of the preceding claims, and which receives the input signal and forwards such to a subsequent direct voltage converter, which forms a galvanic isolation between the primary side and the secondary side and wherein the switching power supply has no control loop between the primary side and the secondary side.

BRIEF DESCRIPTION OF THE DRAWINGS

The invention will now be explained in greater detail based on the appended drawing, the figures of which show as follows.

DETAILED DISCUSSION IN CONJUNCTION WITH THE DRAWINGS

Figure 1:
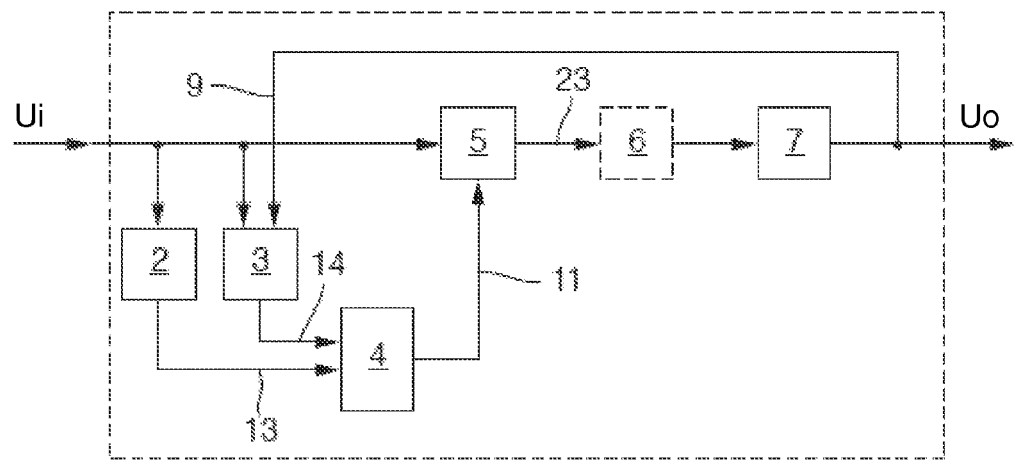
FIG. 1 is a schematic representation of the synchronous rectifier of the invention.

FIG. 1 shows a schematic representation of the synchronous rectifier 1 of the invention for rectifying an alternating voltage signal as input signal $U_i$ or forwarding a dc voltage signal as input signal $U_i$ for use as output signal $U_o$. The input signal $U_i$ can be an alternating voltage signal of any frequency (for example, 50 or 60 Hz) or a dc voltage signal. Furthermore, the input signal $U_i$ can have a voltage of 15 to 230 volt.

The synchronous rectifier 1 of the invention includes, in such case, a rectifying unit 5 composed of at least one controllable switch element 12. The switch element 12 is, in such case, a semiconductor, especially a field effect transistor, such as, for example, STD70N10F4, IRFR4615, NTD6414AN or FDD86110. The rectifying unit 5, in the case, in which the input signal $U_i$ is an alternating voltage signal, rectifies such. In the case, in which the input signal $U_i$ is a dc voltage signal, the rectifying unit 5 forwards the dc voltage signal.

a smoothing unit 7, which is connected after the rectifying unit 5 and smooths to the signal 23 rectified or forwarded by the rectifying unit 5 and provides such for use as output signal $U_o$.

a control logic 2, 3, 4, which based on the input signal $U_i$ and the output signal $U_o$ coming from the smoothing unit 7, operates the rectifying unit 5. The control logic 2, 3, 4 includes, in such case, a digital logic unit 4, which by means of at least one control signal 11 controls the at least one controllable switch element 12 of the rectifying unit 5. Furthermore, the control logic 2, 3, 4 includes a zero point detection unit 2, which detects the zero crossings of the input signal $U_i$ and derives therefrom a first auxiliary signal 13, wherein from the first auxiliary signal 13 the switch off point 22 for the rectifying unit is generated.

Additionally, the control logic 2, 3, 4 includes a comparison unit 3, which in the simplest case is a comparator with integrated (passive) rectifier and compares the input signal $U_i$ with the output signal $U_o$, in order to derive a second auxiliary signal 14, which represents the switch on point 21 for the rectifying unit 5.

The digital logic unit 2, 3, 4 produces based on the switch on point 21 and the switch off point 22, which are transmitted in the form of the first and second auxiliary signals 13, 14, the control signal, respectively the control signals 11, in case a plurality of switch elements 12 are applied. The first auxiliary signal 13 as well as also the second auxiliary signal 14 and the control signal, respectively the control signals 11 are, in such case, digital signals.

FIG. 1 shows, furthermore, an overvoltage protection unit 6, which is arranged between the rectifying unit 5 and the smoothing unit 7, in order to limit the signal rectified by the rectifying unit 5 or forwarded signal 23 to a certain turn off threshold 10. The turn off threshold 10 is freely selectably, respectively adjustable, and can, thus, be matched optimally to a direct voltage converter (DC/DC converter) 16 in the case of use of the synchronous rectifier 1 in a switching power supply 15. Additionally, the overvoltage protection unit 6 prevents that the subsequent smoothing unit 7 is loadable above the turn off threshold 10 and, thus, prevents damage from a too high signal.

Figure 2:
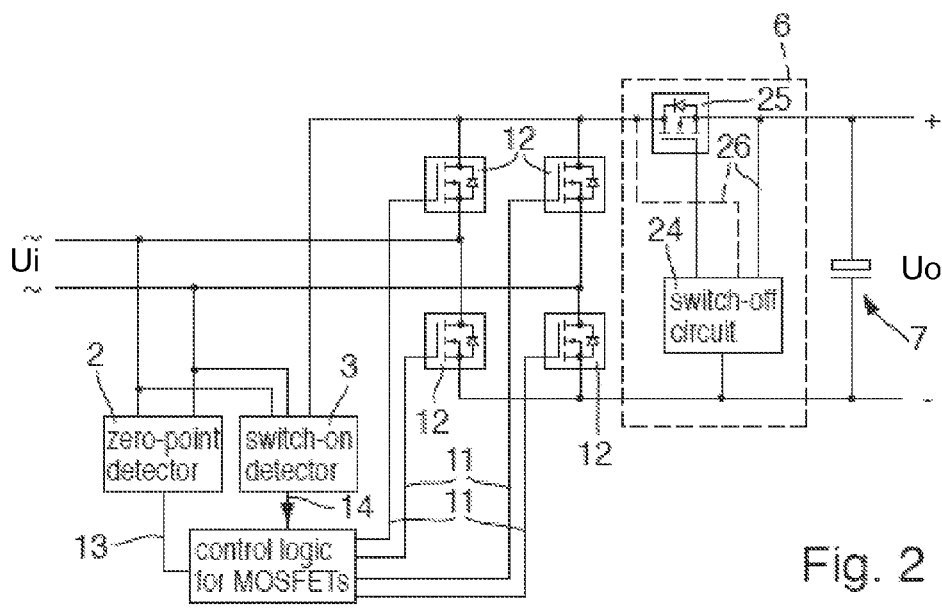
FIG. 2 is a detailed representation of the synchronous rectifier of the invention.

FIG. 2 shows a detailed drawing of the synchronous rectifier 1 of the invention. The control logic 2, 3, 4 is embodied in such a manner that it produces, based on the zero point detection unit 2 and the comparison unit 3 as a well as the digital logic unit 4, four control signals 11, which operate the four switch elements 12 of the rectifying unit 5. The four switch elements 12 are, in such case, embodied as field effect transistors.

The overvoltage protection unit 6 includes a switch off logic 24 and a switch off element 25, which is activated by the switch off logic 24 in the case of an exceeding of the turn off threshold 10. The switch off logic 24 can, depending on performance, tap its feedback-signal 26 before (dashed line in FIG. 2) or after (solid line in FIG. 2) the switch off element 25.

Figure 3A:
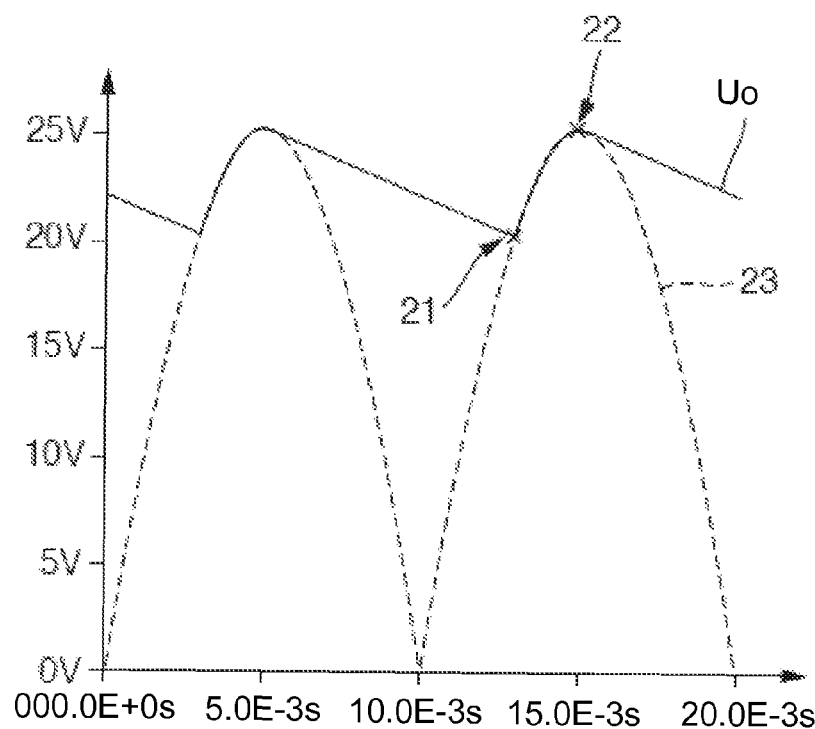
FIG. 3 is a schematic representation of the in- and output signals of the synchronous rectifier of the invention.

FIG. 3 shows a schematic representation of signals of the synchronous rectifier 1 of the invention. FIG. 3a shows the case, in which an alternating voltage signal is applied to the synchronous rectifier 1 as input signal $U_i$.

Serving for operating the switch elements 12 of the rectifying unit 5, such as already described, is the digital control logic 4, which ascertains the switching points by means of the zero point detection unit 2 and the comparison unit 3. In such case, the zero point detection unit 2 ascertains the switch off point 22 for rectifying unit 5 in such a manner that the switch off point 22 represents the point in time lying between two zero crossings. Additionally, the comparison unit 3 derives the switch on point 21 from the difference between the output signal $U_o$ and the input signal $U_i$ rectified internally in the comparison unit, for example, when the difference is greater than a predetermined difference value.

The so ascertained switch on points 21 and switch off points 22 are fed by means of the first auxiliary signal 13 and the second auxiliary signal 14 to the digital logic unit 4, which, in turn, by means of the control signal 11 operates the switch element 12 of the rectifying unit 5. In this way, the input signal $U_i$ is converted by means of the synchronous rectifier 1 of the invention into a corresponding output signal $U_o$.

Figure 3B:
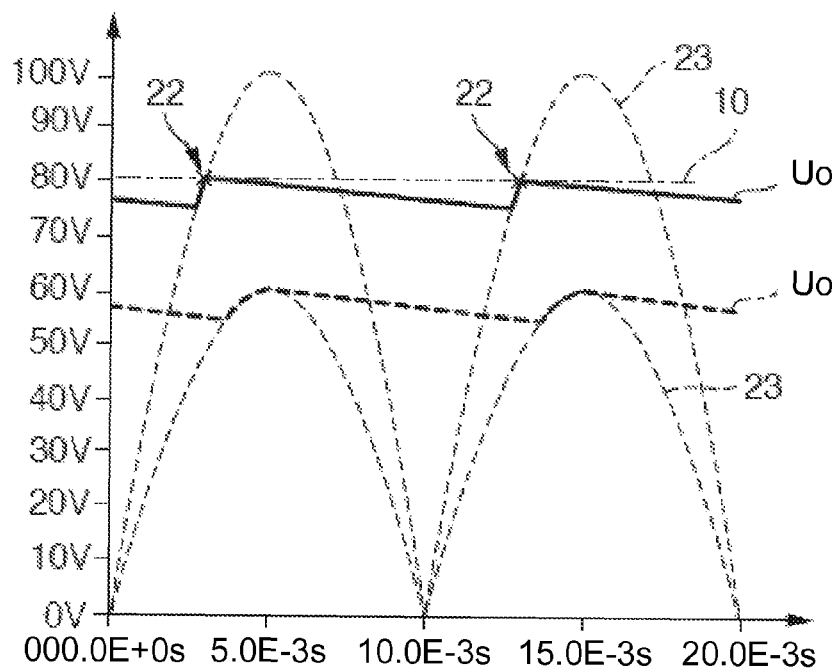

FIG. 3b shows the turn off threshold 10, at which the overvoltage protection unit 6 becomes active. For this, two scenarios are shown, one when the rectified signal (dashed lines) 23 lies clearly below the turn off threshold 10 is and one when the rectified signal (solid line) 23 lies above the turn off threshold 10. In the case, in which the rectified signal 23 lies above the turn off threshold 10, the output signal $U_o$ is limited to the turn off threshold 10 by matching the switch off point 22 correspondingly to the turn off threshold 10. The turn off threshold 10 is, in such case, freely selectable, in order not to charge the smoothing unit 7, which, for example, includes a capacitor, above this threshold. In this way, the input range $U_i$ of the smoothing unit 7 is limited to the turn off threshold 10 and the size of the capacitor can be correspondingly matched.

Figure 4:
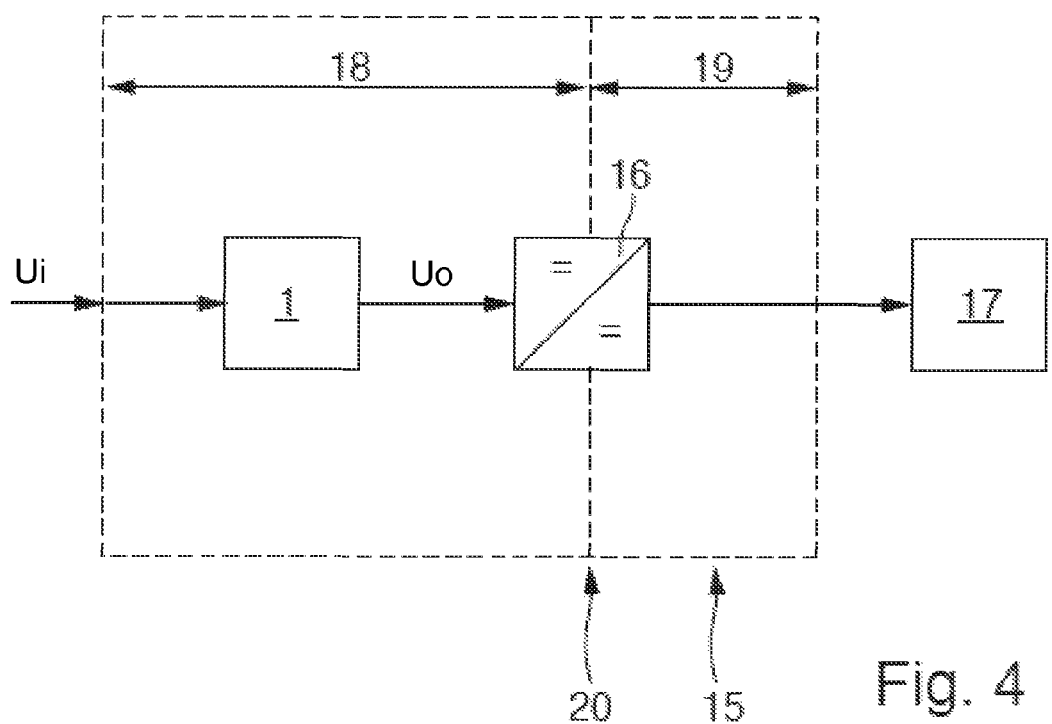
FIG. 4 is a schematic representation of a switching power supply with a synchronous rectifier of the invention.

FIG. 4 shows a schematic drawing of a switching power supply 15 with a synchronous rectifier 1 of the invention. The switching power supply 15 serves, in such case, for energy supply of a load 17, for example, a field device. The switching power supply 15 includes a primary side 18 and a secondary side 19. The primary side 18 includes, in such case, a synchronous rectifier 1 of the invention, such as described above. The synchronous rectifier 1 receives the input voltage $U_i$, which is a direct voltage or an alternating voltage, and supplies the output signal $U_o$ to a subsequent direct voltage converter 16. The direct voltage converter 16 forms, in such case, per se, a galvanic isolation 20 between the primary side 18 and the secondary side 19, wherein no control loop is provided, respectively is required, between the two sides 18, 19.

The invention claimed is:

1. A synchronous rectifier, which rectifies an alternating voltage signal as an input signal, to an output signal and/or forwards a dc voltage signal as an input signal for use as an output signal, at least comprising: a rectifying unit composed of at least one controllable switch element; a smoothing unit, which is connected to said rectifying unit and smooths the signal rectified or forwarded by said rectifying unit, in order to provide a smoothed signal for use as an output signal; and a control logic, which controls said rectifying unit based on the input signal and the output signal coining from said smoothing unit, wherein: said control logic includes a digital logic unit, which by means of at least one control signal operates said at least one controllable switch element of said rectifying unit; said control logic includes a zero point detection unit and a comparison unit; said zero point detection unit registers zero crossings of the input signal and derives therefrom a first auxiliary signal; and said comparison unit compares the input signal with the output signal and derives therefrom a second auxiliary signal.

2. The synchronous rectifier as claimed in claim 1, further comprising:
   an overvoltage protection unit, which is arranged between said rectifying unit and said smoothing unit and limits the signal rectified by said rectifying unit to a certain turn off threshold.

3. The synchronous rectifier as claimed in claim 2, wherein:
   said turn off threshold is changeable.

4. The synchronous rectifier as claimed in claim 1, wherein: said digital logic unit based on the first and the second auxiliary signal produces said at least one control signal for operating said at one controllable switch element of said rectifying unit.

5. The synchronous rectifier as claimed in claim 1, wherein:
   the first and second auxiliary signals and the control signal are digital signals.

6. The synchronous rectifier as claimed in claim 1, wherein:
   said at least one controllable switch element is a semiconductor.

7. A switching power supply comprising the synchronous rectifier as claimed in claim 1, wherein:
   the synchronous rectifier is arranged on a primary side and receives said input signal of the switching power supply and supplies said output signal to a subsequent direct voltage converter;
   the direct voltage converter forms a galvanic isolation between the primary side and a secondary side and the switching power supply has no control loop between the primary side and the secondary side.

8. A switching power supply for energy supply of a load, wherein the switching power supply has a primary side and a secondary side, said primary side has at least one synchronous rectifier, which rectifies an alternating voltage signal as an input signal to an output signal and/or forwards a dc voltage signal as an input signal for use as an output signal, said at least one synchronous rectifier comprising: a rectifying unit composed of at least one controllable switch element; a smoothing unit, which is connected to said rectifying unit and smooths the signal rectified or forwarded by said rectifying unit, in order to provide a smoothed signal for use as an output signal; and a control logic, which controls said rectifying unit based on the input signal and the output signal coming from said smoothing unit, and which receives the input signal and supplies an output signal to a subsequent direct voltage converter, which forms a galvanic isolation between the primary side and the secondary side, wherein: said control logic includes a digital logic unit, which by means of at least one control signal operates said at least one controllable switch element of said rectifying unit; said control logic includes a zero point detection unit and a comparison unit; said zero point detection unit registers zero crossings of the input signal and derives therefrom a first auxiliary signal; and said comparison unit compares the input signal with the output signal and derives therefrom a second auxiliary signal; and the switching power supply has no control loop between the primary side and the secondary side.

* * * * *